(12) United States Patent
Cossairt et al.

(10) Patent No.: US 11,303,793 B2
(45) Date of Patent: Apr. 12, 2022

(54) SYSTEM AND METHOD FOR HIGH-RESOLUTION, HIGH-SPEED, AND NOISE-ROBUST IMAGING

(71) Applicants: Northwestern University, Evanston, IL (US); Peking University, Beijing (CN)

(72) Inventors: Oliver Strider Cossairt, Evanston, IL (US); Boxin Shi, Beijing (CN); Zihao Wang, Evanston, IL (US); Peiqi Duan, Beijing (CN); Aggelos K. Katsaggelos, Chicago, IL (US); Tiejun Huang, Beijing (CN)

(73) Assignees: Northwestern University, Evanston, IL (US); Peking University, Beijing (CN)

( * ) Notice: Subject to any disclaimer, the term of this patent is extended or adjusted under 35 U.S.C. 154(b) by 0 days.

(21) Appl. No.: 17/227,691

(22) Filed: Apr. 12, 2021

(65) Prior Publication Data
US 2021/0321052 A1    Oct. 14, 2021

Related U.S. Application Data

(60) Provisional application No. 63/009,004, filed on Apr. 13, 2020.

(51) Int. Cl.
*H04N 5/225*    (2006.01)
*H04N 5/232*    (2006.01)
(Continued)

(52) U.S. Cl.
CPC ......... *H04N 5/2258* (2013.01); *G06T 1/0007* (2013.01); *G06T 5/002* (2013.01);
(Continued)

(58) Field of Classification Search
CPC .. H04N 5/2251; H04N 5/2254; H04N 5/2253; H04N 5/2258; H04N 5/23229;
(Continued)

(56) References Cited

U.S. PATENT DOCUMENTS

2017/0213324 A1*  7/2017  Wang .................. G06T 5/50
2018/0098082 A1*  4/2018  Burns ................. H04N 19/117
(Continued)

OTHER PUBLICATIONS

Antoni Rosinol Vidal, et al., "Ultimate slam? combining Events, Images, and IMU for robust visual slam in HDR and high-speed scenarios," IEEE Robotics and Automation Letters, vol. 3, No. 2; pp. 994-1001, 2018.
(Continued)

*Primary Examiner* — Daniel M Pasiewicz
(74) *Attorney, Agent, or Firm* — Bell & Manning, LLC (57) ABSTRACT

An imaging system includes an event camera configured to capture a first image of a scene. The system also includes a shutter camera collocated with the event camera, where the shutter camera is configured to capture a second image of the scene. The system also includes a processor operatively coupled to the event camera and the shutter camera. The processor is configured to apply guided event filtering (GEF) on the first image and the second image. The processor is also configured to generate a third image based on filtering of the first image and the second image.

18 Claims, 10 Drawing Sheets

(51) Int. Cl.
*G06T 5/00* (2006.01)
*G06T 1/00* (2006.01)

(52) U.S. Cl.
CPC ....... *H04N 5/2251* (2013.01); *H04N 5/23229* (2013.01); *H04N 5/23254* (2013.01); *H04N 5/23267* (2013.01); *G06T 2207/10141* (2013.01); *G06T 2207/20182* (2013.01)

(58) Field of Classification Search
CPC ............ H04N 5/23254; H04N 5/23267; G06T 1/0007; G06T 5/002; G06T 7/246; G06T 2207/10141; G06T 2207/20182; G06T 2207/20201
See application file for complete search history.

(56) References Cited

U.S. PATENT DOCUMENTS

2021/0048605 A1* 2/2021 Lim ................. G02B 15/04
2021/0174092 A1* 6/2021 Zhao ................. G06T 3/40

OTHER PUBLICATIONS

Vandana Padala et al., "A noise filtering algorithm for event-based asynchronous change detection image sensors on TrueNorth and its implementation on TrueNorth," *Frontiers in Neuroscience*, vol. 12, Article118, Mar. 2018; pp. 1-14.

Kaiming He et al., "Guided image filtering," IEEE Transactions on Pattern Analysis and Machine Intelligence, vol. 35, No. 6, pp. 1397-1409, Jun. 2013.

Guillermo Gallego et al., "A unifying contrast maximization framework for event cameras, with applications to motion, depth, and optical flow estimation,". In Proc. of the IEEE Conference on Computer Vision and Pattern Recognition (CVPR), pp. 3867-3876, 2018.

Pravin Bhat et al., "Using photographs to enhance videos of a static scene," In Proc. of the 18th Eurographics conference on Rendering Techniques, pp. 327-338. Eurographics Association, 2007.

Ryad Benosman et al., "Event-based visual flow," IEEE transactions on neural networks and learning systems, vol. 25, No. 2; pp. 407-417, Feb. 2014.

* cited by examiner

| methods | 2× | 4× | 8× |
|---|---|---|---|
| (1) no guidance SR | | | |
| Bicubic | 40.110 | 39.133 | 39.368 |
| EDSR | 39.976 | 39.363 | 39.319 |
| SRFBN | 40.572 | 39.937 | 40.152 |
| EDSR-ev | 40.315 | 40.577 | 39.961 |
| SRFBN-ev | 40.837 | 40.309 | 40.110 |
| (2) guided SR, w/ SR image | | | |
| Bicubic | 42.591 | 42.612 | 44.144 |
| EDSR | 42.599 | 42.655 | 44.174 |
| SRFBN | 42.603 | 43.037 | 44.170 |
| (3) GEF | 42.755 | 43.319 | 44.218 |

SYSTEM AND METHOD FOR HIGH-RESOLUTION, HIGH-SPEED, AND NOISE-ROBUST IMAGING

CROSS-REFERENCE TO RELATED APPLICATION

The present application claims the priority benefit of U.S. Provisional Patent App. No. 63/009,004 filed on Apr. 13, 2020, the entire disclosure of which is incorporated by reference herein.

REFERENCE TO GOVERNMENT RIGHTS

This invention was made with government support under HR0011-17-2-0044 awarded by The Defense Advanced Research Projects Agency (DARPA). The government has certain rights in the invention.

BACKGROUND

An event camera, which can also be referred to as a neuromorphic camera, a silicon retina sensor, or a dynamic vision sensor, is an imaging sensor that responds to local changes in brightness. Event cameras do not capture images using a shutter, which is the way that conventional cameras capture imagery. Rather, with an event camera, each pixel inside the camera operates independently and asynchronously, reporting changes in brightness as they occur, and staying silent otherwise. Traditional event cameras have microsecond temporal resolution, 120 decibel (dB) dynamic range, and do not suffer from under/overexposure or motion blur.

SUMMARY

An illustrative imaging system includes an event camera configured to capture a first image of a scene. The system also includes a shutter camera collocated with the event camera, where the shutter camera is configured to capture a second image of the scene. The system also includes a processor operatively coupled to the event camera and the shutter camera. The processor is configured to apply guided event filtering (GEF) on the first image and the second image. The processor is also configured to generate a third image based on filtering of the first image and the second image.

An illustrative imaging method includes capturing, by an event camera, a first image of a scene. The method also includes capturing, by a shutter camera collocated with the event camera, a second image of the scene. The method also includes applying, by a processor operatively coupled to the event camera and the shutter camera, guided event filtering (GEF) on the first image and the second image. The method further includes generating, by the processor, a third image based on filtering of the first image and the second image.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Recently, a new breed of bio-inspired sensors called event cameras, or Dynamic Vision Sensors (DVS), has gained growing attention with its distinctive advantages over traditional frame cameras such as high speed, high dynamic range (HDR) and low power consumption. Thus far, event cameras have shown promising capability in solving classical as well as new computer vision and robotics tasks, including optical flow estimation, HDR imaging, motion deblurring, high framerate video synthesis, 3D reconstruction and tracking, visual SLAM, and autonomous wheel steering.

Despite numerous advances in event-based vision, current event sensor prototypes, e.g., DAVIS240, still bear low spatial resolution and severe noise. Moreover, the unique event sensing mechanism according to which each pixel individually responds to brightness changes and outputs a cloud of continuously timestamped address points renders event-based super resolution and denoising elusively challenging. On the other hand, commercial frame sensors can easily acquire millions of pixels, and image-based super resolution and denoising algorithms are highly advanced after decades of development. These sensory and algorithmic imbalances motivated the inventors to explore whether a system can make complementary use of event and frame sensing, what the unifying mechanism for such a system would be, and the synergy of the system benefits related to visual tasks and applications.

To answer these questions, a hybrid camera system was formed using a low-resolution event camera, i.e., DAVIS240 and a high-resolution RGB camera (or shutter camera). A computational framework was established that bridges event sensing with frame sensing. The system inherits the high-resolution property (8× higher than DAVIS) from the frame camera, the highspeed property (~10 μs) from the event camera, and is robust to sensor noise. The proposed system provides a novel optimization framework and guided event filtering (GEF), which includes a novel motion compensation algorithm unifying event and frame sensing. By taking complimentary advantages from each end, GEF achieves high-resolution and noise-robust imaging, making the proposed imaging system the first system to simultaneously achieve event denoising and super resolution. Additionally, the proposed system also has low system complexity, which makes it easier for industry manufacturing.

A new dataset, i.e., RGB-DAVIS, collected from the prototype hybrid camera system is also introduced. Comprehensive experiments were performed to validate GEF on both publicly available datasets and the RGB-DAVIS dataset. Broad applications of GEF were demonstrated to benefit optical flow estimation, high frame rate video synthesis, corner detection and tracking, and HDR image reconstruction.

In some embodiments, the proposed system can include a traditional video camera which captures high-resolution intensity images, and an event camera which encodes high-speed motion as a stream of asynchronous binary events, which results in a hybrid input. To process the hybrid input, a unifying framework is used that first bridges the two sensing modalities via a noise-robust motion compensation model, and then performs joint image filtering. The filtered output represents the temporal gradient of the captured space-time volume, which can be viewed as motion-compensated event frames with high resolution and low noise. Therefore, the output can be widely applied to many existing event-based algorithms that are highly dependent on spatial resolution and noise robustness. In experimental results performed on both publicly available datasets as well as a contributing RGB-DAVIS dataset, the system demonstrated systematic performance improvement in applications such as high frame-rate video synthesis, feature/corner detection and tracking, and high dynamic range image reconstruction.

The proposed system improves upon traditional techniques to improve the overall image generation process. For example, event denoising can be considered a preprocessing step in the image generation process. Existing event denoising approaches exploit local spatial-temporal correlations, and label isolated events as noise to be canceled. However, these denoisers face challenges when retrieving missing events for low contrast spatial texture. As discussed herein, this issue is addressed by exploiting the correlation between events and an intensity image.

Motion compensation is an emerging technique to associate local events. It has shown benefits for downstream applications such as depth estimation, motion segmentation, and feature tracking. The assumption is that local events are triggered by the same edge signal and should comply with the same motion flow. The flow parameter can be estimated by maximizing the contrast of the histogram/image of the warped events. The proposed system improves this process by maximizing the contrast of an image jointly formed by the warped events as well as the image edge, such that one is able to obtain improved flow estimation.

The tradeoff between spatial resolution and temporal resolution in modern sensors introduces a fundamental performance gap between still cameras and video cameras. To address this issue, several methods have emerged that utilize inter-frame correspondences via optical flow and/or space-time regularization. Hybrid cameras have been designed towards flexible, adaptive sensing of high speed videos. Compressive video sensing prototypes have been devised with additional spatio-temporal encoders and compressive sensing algorithms for data recovery and inference. Extensions of compressive sensing high-speed imaging have achieved single-shot 3D video recovery by incorporating active illumination. The proposed systems are different from existing prototypes as they involve the combination of high-resolution video and highspeed events. The major advantage of using an event camera is its cost effectiveness in computing optical flow.

The goal of guided/joint image filters is to transfer structural information from a reference image to a target image. The reference and the target can be identical, in which case the filtering process becomes an edge-preserving one. Although similar ideas of guided/joint image filtering (GIF) have been explored between RGB and near infrared (NIR) images, 3D-ToF, and hyperspectral data, the major challenge for applying GIF to event cameras is that events do not directly form an image and are spatio-temporally misaligned by scene motions or illumination variations. It is demonstrated herein that the events, after a motion compensation step, have structural similarities with respect to the image gradient. The sought-after similarity enables structural transfer from the image to the events.

Described below are the event sensing preliminaries, and derivation of its relation to intensity/frame sensing. The framework guided event filtering (GEF) is also introduced in terms of motion step compensation, joint filtering, and implementation details.

One can consider a latent space-time volume ($\Omega \times T \in \mathbb{R} \times \mathbb{R}$) in which an intensity field is sampled simultaneously by a frame-based camera which outputs intensity images I(x, y;t) and an event camera which outputs a set of events, i.e., $\varepsilon = \{e_{t_k}\}_{k=1}^{N_e}$, where $N_e$ denotes the number of events. Each event is a four-attribute tuple $e_{t_k} = (x_k, y_k, t_k, p_k)$, where $x_k$, $y_k$ denote the spatial coordinates, $t_k$ the timestamp (monotonically increasing), $p_k$ the polarity. The variable $p_k \in \{-1, 1\}$ indicates the sign of the intensity variation in log space, i.e., $p_k=1$ if $\theta_t > \epsilon_p$ and $p_k=-1$ if $\theta_t < \epsilon_n$, where $\theta_t = \log(I_t + b) - \log(I_{t-\delta t} + b)$. In this equation, b is an infinitesimal positive number to prevent log(0), $I_t$ and $I_{t-\delta t}$ denote the intensity values at time t and t−δt, respectively, and $\varepsilon_p$ and $\varepsilon_n$ are contrast thresholds. The variable $L_t$ is used to denote the log intensity at time t, i.e., $L_t = \log(I_t + b)$. For now, it is assumed that I and E have the same spatial resolution.

It can be shown that the event and intensity/frame sensing are bridged via temporal gradients. On the intensity side, the optical flow assumption is employed for deriving the temporal gradient of the latent field L. It can be assumed that in a small vicinity, there exists a small flow vector $\delta u = [\delta x, \delta y, \delta t]^T$ under which the intensity is assumed to be constant. Mathematically, this assumption can be expressed as:

$$L(x+\delta x, y+\delta y, t_{ref}+\delta t) = L(x, y, t_{ref}). \quad \text{Equation 1:}$$

The Taylor series expansion of the left side of Eq. (1) gives:

$$L_{t_{ref}+\delta t} = L_{t_{ref}} + \nabla_{xyt} L_{t_{ref}} \delta u + o(|\delta x| + |\delta y| + |\delta t|), \quad \text{Equation 2}$$

$$\text{where } \nabla_{xyt} L_{t_{ref}} = \left[\frac{\partial L}{\partial x}, \frac{\partial L}{\partial y}, \frac{\partial L}{\partial t}\right]\bigg|_{t_{ref}}$$

denotes the gradient operator evaluated at time $t_{ref}$.

If one substitutes only the zero and first-order terms to approximate $L_{t_{ref}+\delta t}$ and re-arranges Eq. (1), one can obtain the following relation:

$$\frac{\partial L}{\partial t}\bigg|_{t_{ref}} \simeq -\nabla_{xy} L_{t_{ref}} v \doteq Q^I \quad \text{Equation 3}$$

$$\text{where } \nabla_{xy} \mathcal{L}_{t_{ref}} = \left[\frac{\partial \mathcal{L}_{t_{ref}}}{\partial x}, \frac{\partial \mathcal{L}_{t_{ref}}}{\partial y}\right]$$

denotes the spatial gradient of $L_{t_{ref}}$, and $$v = \left[\frac{\delta x}{\delta t}, \frac{\delta y}{\delta t}\right]^T$$

is the velocity vector.

Figure 1A:
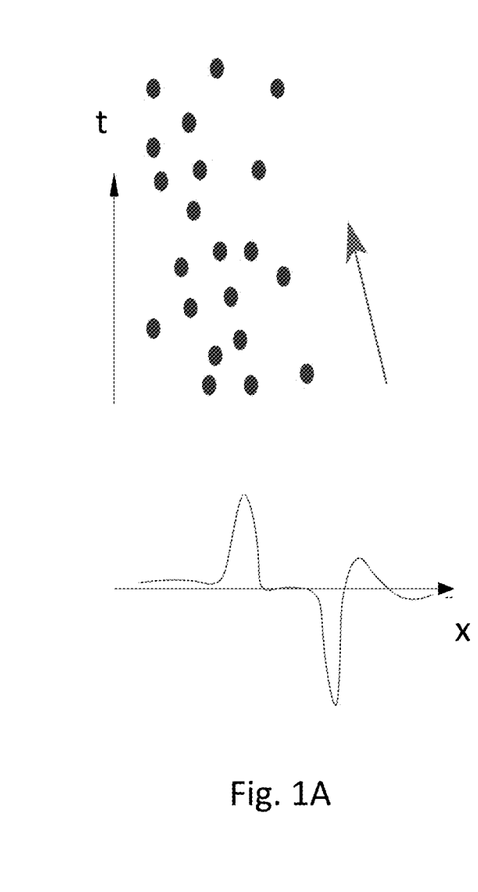
FIG. 1A depicts how a latent edge signal (curve) triggers a set of noisy events due to motion in accordance with an illustrative embodiment.

For future reference, the temporal gradient derived from an intensity image is defined as $Q^I$. On the event side, the flow velocity v results in position shifts for local events. This is based on the assumption that local events are triggered by the same edge. FIG. 1A depicts how a latent edge signal (curve) triggers a set of noisy events due to motion in accordance with an illustrative embodiment. Therefore, the temporal gradient can be approximated by the tangent of a set of warped events in a local window:

$$\frac{\partial L}{\partial t}\bigg|_{t_{ref}} \approx \frac{\Sigma(t_k - t_{ref}) \in (0, \delta_t) \varepsilon_k \delta(x - x_k')}{\delta t} \doteq Q^e, \quad \text{Equation 4}$$

where $\varepsilon_k = \varepsilon_p$, if $p_k = 1$; and $\varepsilon_k = \varepsilon_n$, if $p_k = -1$. $\delta(\cdot)$ is the Dirac delta function. The vector $x_k'$ is the event location by warping (back propagating) measured events to time $t_{ref}$ according to the flow velocity v, i.e., $x_k' = x_k - (t_k - t_{ref})v$, where $x = [x, y]^T$, $x_k = [x_k, y_k]^T$, and $x_k' = [x_k', y_k']$. For future reference, the temporal gradient derived from events is defined as $Q^e$.

From Eq. (4) and Eq. (3) one can obtain:

$$Q^e \simeq Q^I. \quad \text{Equation 5:}$$

The above equation establishes the relation between events and image spatial gradients. There are two unknowns, $\varepsilon_k$ and v in the relation, where $\varepsilon_k \in \{\varepsilon_p, \varepsilon_n\}$ can be obtained from the event camera configuration. Numerically, $\varepsilon_k$ can be viewed as a constant scaling value to match $Q^e$ with $Q^I$. The key unknown is the flow velocity v.

Figure 1B:
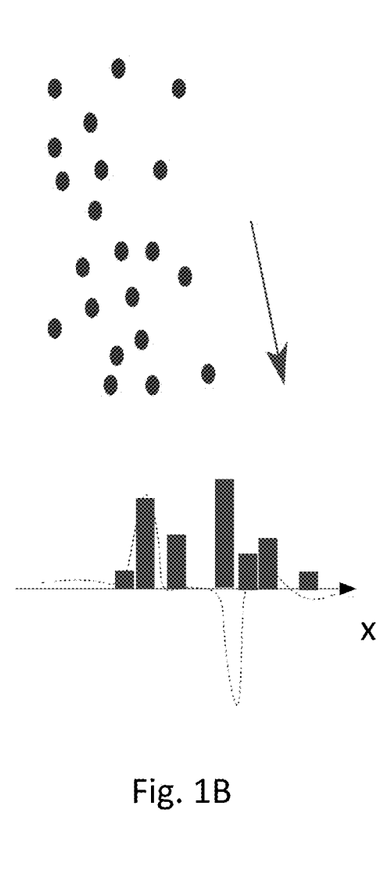
FIG. 1B illustrates contrast maximization (CM) in which the events are warped back at $t_{ref}$ to form a histogram in accordance with an illustrative embodiment.
Figure 1C:
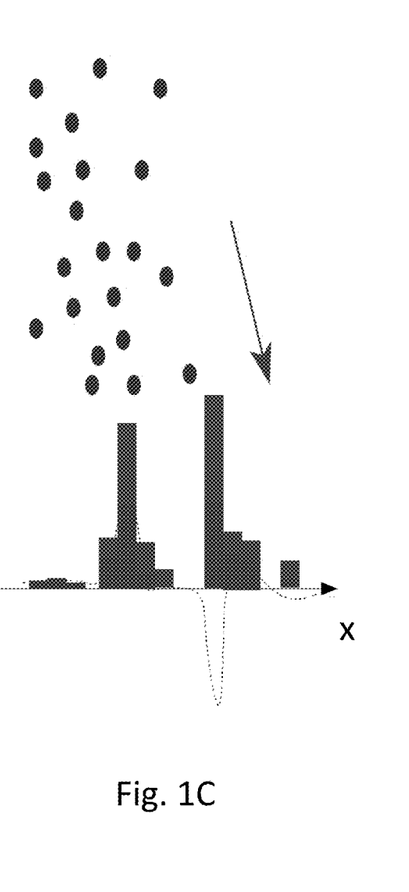
FIG. 1C depicts using joint contrast maximization (JCM) to form an image jointly by the events and the edge of the intensity image in accordance with an illustrative embodiment.

The proposed system is also designed to maximize joint contrast. Previous work proposed contrast maximization (CM) to optimize the flow parameter based on the contrast of the image (or histogram) formed only by the warped events. FIG. 1B illustrates contrast maximization (CM) in which the events are warped back at $t_{ref}$ to form a histogram in accordance with an illustrative embodiment. However, CM is designed for event data alone. In the presence of an intensity image, one can extend the framework of CM and propose joint contrast maximization (JCM) to estimate the flow vector based on intensity image and events. Particularly, it is proposed to maximize the contrast of an image/histogram jointly formed by the absolute edge of the intensity image and the warped events. FIG. 1C depicts using joint contrast maximization (JCM) to form an image jointly by the events and the edge of the intensity image in accordance with an illustrative embodiment. Mathematically, the image of warped events and intensity edge is expressed as:

$$J(x;v) = \Sigma_{k=1}^{N_e} \delta(x - x_k'(v)) + \alpha S(x), \quad \text{Equation 6:}$$

where S(x) is the edge image and can be defined as $S(x) = \sqrt{|g_x I(x)|^2 + |g_y I(x)|^2}$. The Sobel edge (without thresholding) was used as a discrete approximation. The x-axis kernel can be defined as $g_x = [-1, 0, 1; -2, 0, 2; -1, 0, 1]$, $g_y = g_x^T$, and $$\alpha = \frac{N_e}{\Sigma_{i,j} s(i, j)}$$

is a normalization coefficient to balance the energy of the two data.

The objective for estimating the flow velocity is:

$$\hat{v} = \text{argmax} \frac{1}{N_p} \sum_{ij} (J_{ij} - \bar{J})^2, \quad \text{Equation 7}$$

where $N_p$ indicates the number of pixels in image patch J, while $\bar{J}$ denotes the mean value of J. It is noted that when no intensity image is available or it has low quality (e.g., it is blurry), the Sobel term can be set to zero and the formulation degenerates to event-only contrast maximization. With non-zero S, the maximal contrast corresponds to the flow velocity that transports events to the image edge. Nonoptimal velocity can lead to a deterioration of the contrast.

Figure 2:
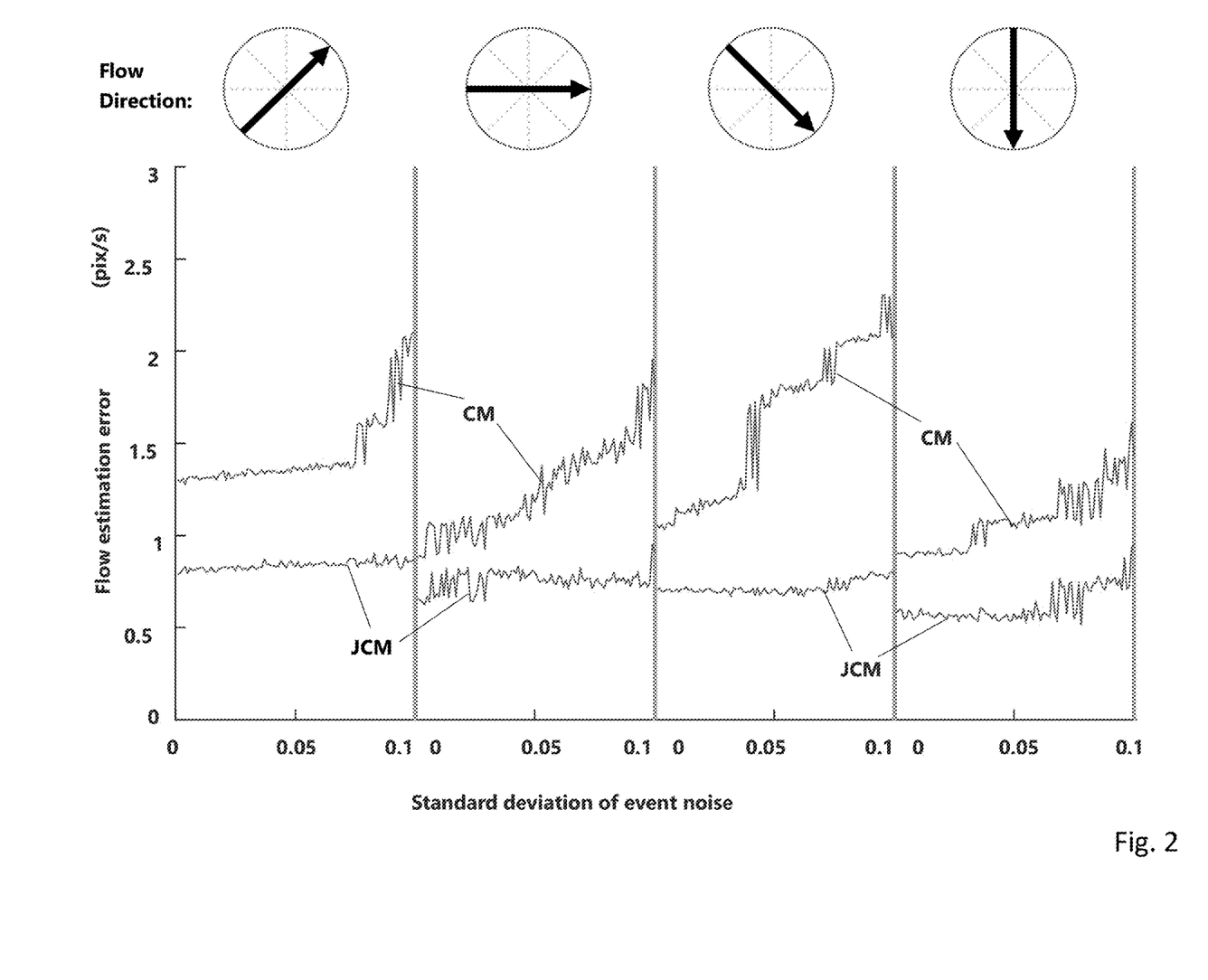
FIG. 2 shows a comparison between CM and JCM for flow estimation with respect to event noise in accordance with an illustrative embodiment.

A numerical comparison was performed between CM and JCM. FIG. 2 shows a comparison between CM and JCM for flow estimation with respect to event noise in accordance with an illustrative embodiment. Event simulation from images was also conducted in the form of a thresholding operation $\varepsilon_p = 0.2$, $\varepsilon_n = -0.2$) applied on the difference image between the flow-shifted image and the original/last image. The event noise follows a Gaussian distribution around the per-pixel threshold values. One can consider a standard deviation range of $\sigma_e \in (0, 0.1)$, and compare the accuracy for flow estimation with respect to different flow directions with fixed flow radius of 5 pixels. The Euclidean distance is used to quantify the flow estimation error. The error is averaged over 18 images of size 30×30. As shown in FIG. 2, both JCM and CM error increases as noise level increases. However, JCM maintains low error across all spectrum of the noise level, revealing a more noise-robust property than CM.

A goal of joint/guided filtering is to construct an optimized output inheriting mutual structures from $Q^e$ and $Q^I$. In guided image filtering, an output image patch $Q^o$ is defined as an affine transformation of the guidance image patch $Q^I$ as follows:

$$Q^o = g_a Q^I + g_b. \qquad \text{Equation 8:}$$

By the above formulation, $Q^o$ inherits the spatial structure of $Q^I$, i.e., $\nabla Q^o = g_a \nabla Q^I$ in each local patch. The objective is generally defined as a data term and a regularization term:

$$\min_{g_a,\ g_b} \|Q^o - Q^e\|_2^2 + \lambda \Phi. \qquad \text{Equation 9}$$

In Equation 9, $\Phi$ is the regularization function and $\lambda$ is the regularization parameter. In particular, 3 filtering techniques were considered, including guided image filtering (GIF), side window guided filtering (SW-GF), and mutual-structure for joint filtering (MS-JF). In GIF, $\Phi = g_a^2$. This regularization term is to prevent coefficient $g_a$ from being too large. In SW-GF, the regularization term is the same as the GIF, but the regression is computed on 8 (upper-half, lower-half, left half, right-half, northwest, northeast, southwest, southeast) side windows instead of a single window centered around the target pixel. Compared to GIF, this filter has the property of better preserving the edges of the filter input image. A MS-JF filter emphasizes the mutual structure between the input and guidance images, and performs filtering in a bidirectional manner. The mutual structure is sought after by minimizing a similarity measure term, i.e., $E_s = \|g_a Q^I + g_b - Q^e\|_2^2 + \|g_a' Q^e + g_b' - Q^I\|_2^2$, where $g_a'$ and $g_b'$ denote the counterpart coefficients for using $Q^e$ to represent $Q^I$. Additionally, the regularization term, i.e., $E_r = \lambda_1 g_a^2 + \lambda_2 g_a'^2$, as well as the deviation term which avoids filtered output deviating too far from the original images, i.e., $E_d = \lambda_3 \|g_a Q^I + g_b - Q^I\|_2^2 + \lambda_4 \|g_a' Q^e + g_b' - Q^e\|_2^2$. The objective is to minimize the summed loss terms, i.e., $E = E_s + E_r + E_d$, over $g_a$, $g_b$, $g_a'$, $g_b'$.

An illustrative algorithm (Algorithm 1) for GEF can take an intensity image I and events ε as inputs. An output can be the filtered temporal gradient $Q^o$. The filtered temporal gradient can be determined by estimating the flow field v using JCM in Equation 7, computing $Q^I$ in Equation 3 and $Q^e$ in Equation 4, and performing guided filtering according to Equation 9.

In the JCM operation, a local window was used with radius $r_w$ to estimate pixel-wise flow. Areas with events fewer than 1 are skipped. It is noted that the variable $r_w$ may vary due to the structure of the scene. A large rescan be used when the scene has sparse and isolated objects, in exchange for more time to compute the flow field. The intensity image support is slightly larger (about several pixels on four sides) than the event window to prevent fallout of events due to large velocity.

Both the computation of flow velocity and $Q^I$ use the spatial gradient. Therefore, the spatial gradient image can be computed once. The variable $Q^I$ is normalized to match the range of $Q^e$ before the filtering operation. This normalization operation also functions as an estimation for the event threshold ($t_c$). The output image $Q^o$ is rounded to have integer values as the original events are integers. The integers can be interpreted as the event counts.

In the joint filtering operation, the window width was set to 1 for all three filters. Twenty iterations were run for MS-JF. For GIF and SW-GF, $\lambda$ is set to $1\times10^{-3}$. For MS-JF, the same values are assigned for the parameter pairs, i.e., $\lambda_1$ and $\lambda_2$ (~$1\times10^{-2}$), as well as $\lambda_3$ and $\lambda_4$ (~3). This is to encourage equal weights between the input and guidance. Both JCM (for flow estimation) and guided filtering (GIF and SW-GF) are linear in computation time with respect to patch pixel size. MS-JF is an iterative approach which imposes additional requirements. GEF is performed when $Q^e$ and $Q^I$ are at the same resolution and are both grayscale. Details for guided super resolution are included below.

Figure 3:
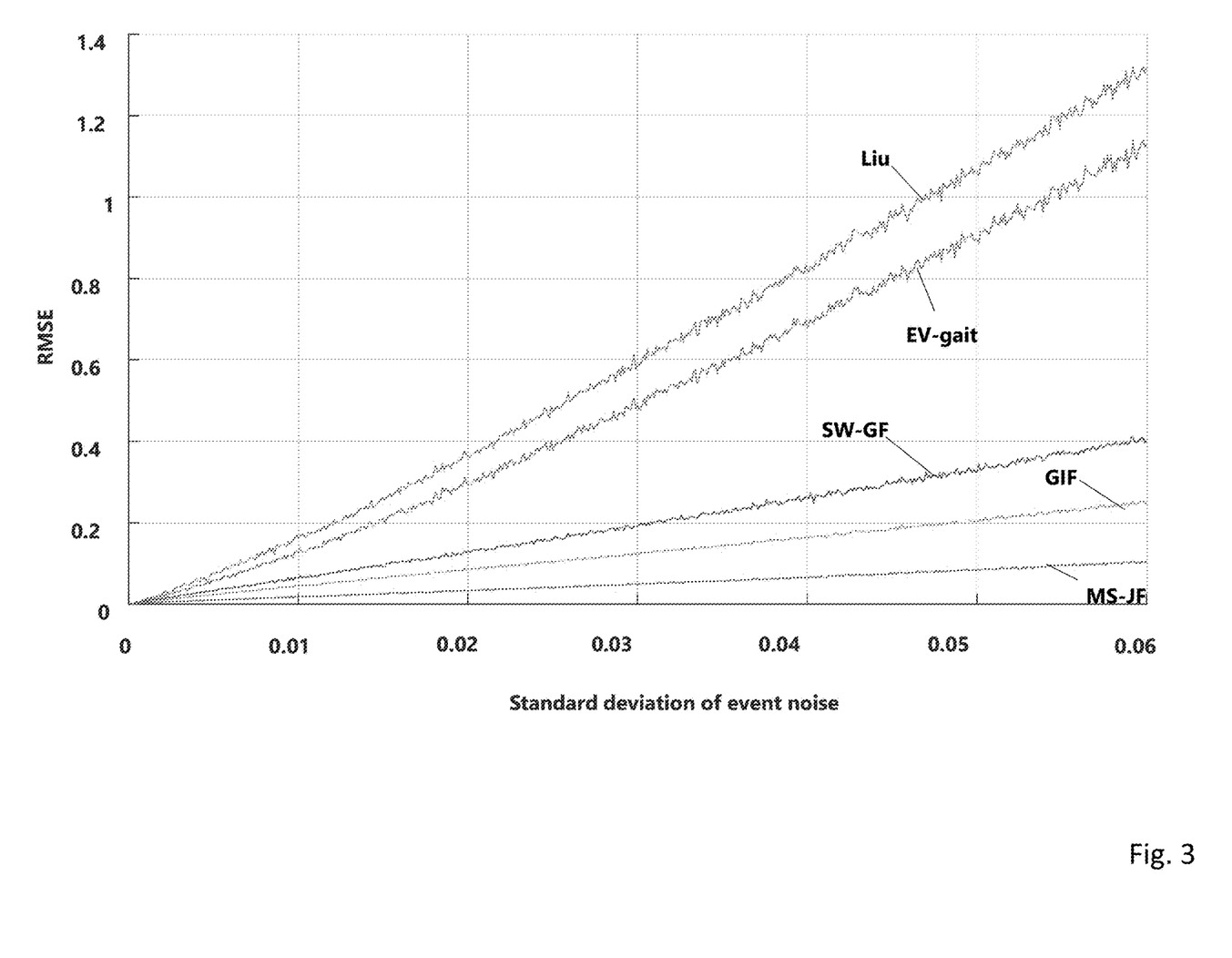
FIG. 3 depicts a comparison of event denoising performance in accordance with an illustrative embodiment.

To comprehensively evaluate the effectiveness of GEF, simulation experiments were designed and a hybrid camera prototype was built to test GEF on real-world scenarios. With respect to guided denoising, in one experiment GEF (considering all three filters) was compared with two state-of-the-art event based denoising approaches. To quantify the denoising performance, a zero-noise event frame was used as the ground truth. The denoised images are compared against the ground truth images using the root mean squared error (RMSE) criterion. The smaller the RMSE values, the better denoising the performance. At each noise level, the RMSE values are averaged over 18 images. FIG. 3 depicts a comparison of event denoising performance in accordance with an illustrative embodiment. As shown, intensity-guided filters (GIF, SW-GF, and MS-JF) unanimously outperform non-guidance-based methods. More specifically, all three GEF methods have better denoising performance compared to non-guidance-based methods. Among the three guided filters, MS-JF has the lowest RMSE values when compared to the other two filters across the whole range. Therefore, MS-JF was chosen as the filtering algorithm within GEF, and only MS-JF results are shown for other experiments.

Qualitatively, the denoising performance on the DAVIS dataset was analyzed, which has the same-resolution between the intensity and the event signals. Specifically, a comparison of denoising performance on the RGB-DAVIS dataset was performed on an image overlaid with events, on an image with $Q^I$ as filter guidance, and with warped events, having $Q^e$ as filter input. Compared to existing approaches such as the Liu approach and EV-gait, it was shown that GEF (MS-JF) is able to enhance the edge features as well as removing event noise.

Because it is challenging to obtain ground truth image and events at multiple scales, quantitative evaluation for up-sampling in simulation was also performed. Eighteen high resolution (HR) images were used to simulate the ground truth HR events. To simulate the low resolution (LR) events, the HR images are first downsized and used to generate zero-noise events using the same procedure described above. Three downsizing scales up to 8× were considered. For future reference, the terms 2×, 4×, and 8× are used to denote the up-sampling factors. For 2× up-sampling, the LR $Q^e$ for 2× was first bicubically up-sampled, and the same resolution joint filtering with 2×$Q^I$ (downsized from HR) was then performed. The 2× up-sampling procedure is iteratively applied for higher scales.

Figure 4:
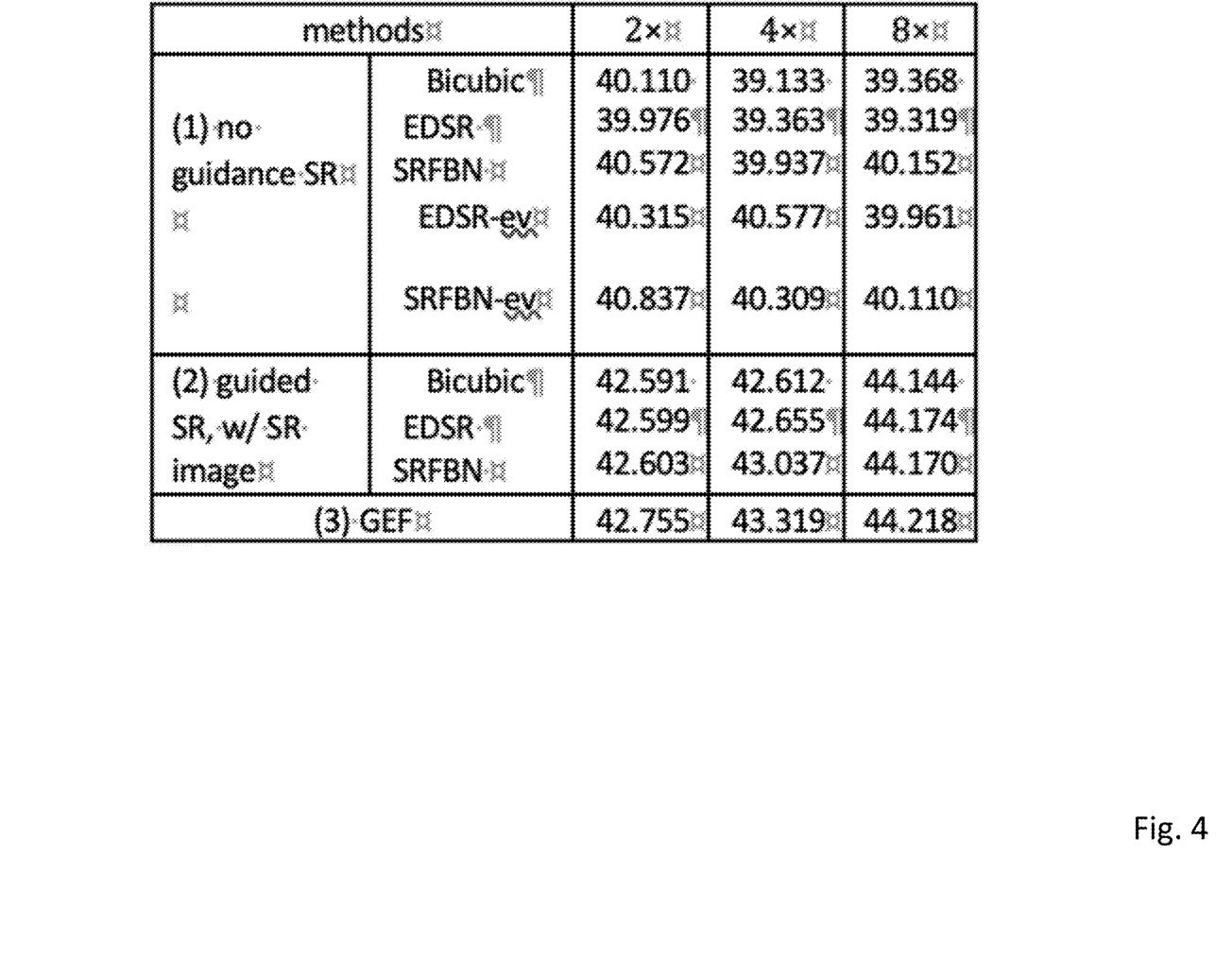
FIG. 4 depicts a table that has results of the comparison of super resolution schemes in accordance with an illustrative embodiment.

Three super resolution (SR) schemes were compared. The first scenario (no guidance SR) refers to direct SR without guidance. Such methods include the baseline bicubic up-sampling, and two state-of-the-art single image SR methods: electric dipole spin resonance (EDSR) and a super resolution feedback network (SRFBN). Pre-trained models as well as re-trained ones were both applied. Re-trained models are denoted as EDSR-ev and SRFBN-ev, respectively. The second scenario is guided SR, with an SR image. In this case, the joint filtering is applied between the computed SR image and the event image. The third scenario was GEF. GEF here refers to joint filtering between the pristine HR image and the event image. FIG. 4 depicts a table that has results of the comparison of super resolution schemes in accordance with an illustrative embodiment. In the results of FIG. 4, the Peak Signal to Noise Ratio (PSNR) was used as a performance measurement. As can be seen, (2) and (3) both have higher PSNR than (1), which suggests the effectiveness of using image as guidance. In (1), re-training SR networks slightly improves the performance, but still underperforms (2) and (3). Another interesting effect in (2) and (3) is that PSNR values increase as scale factor increases. This is because the event image at high resolution has sparse non-zero signals representing thin edge.

Figure 5A:
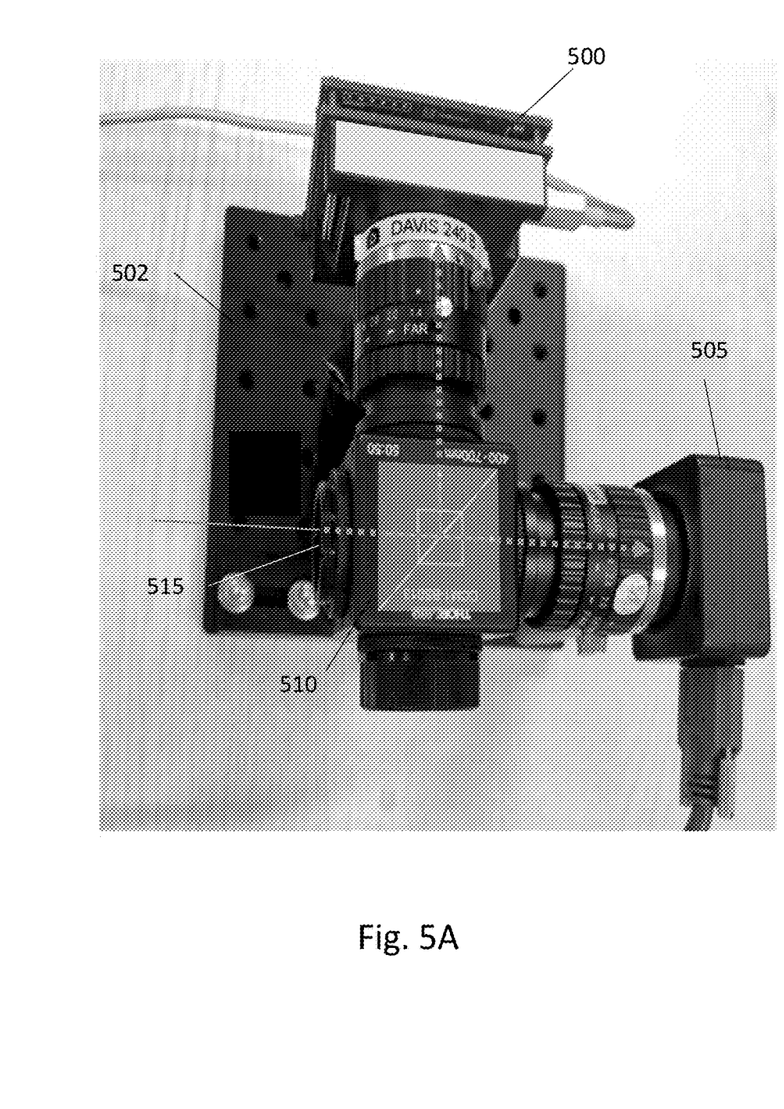
FIG. 5A depicts a prototype of an imaging system in accordance with an illustrative embodiment.

To test GEF for real-world scenarios, a hybrid camera was built that included a high-resolution machine vision camera and a low-resolution event camera, i.e., DAVIS. The camera prototype was referred to as an RGB-DAVIS camera, and is also referred to as the 'imaging system' herein. FIG. 5A depicts a prototype of the imaging system in accordance with an illustrative embodiment. As shown, the imaging system includes an event camera 500 (e.g., DAVIS240b, resolution of 180×190 pixels, with F/1.4 lens) and a machine vision camera 505 or RGB camera (e.g., Point Grey Chameleon3, resolution of 2448×2048 pixels, 50 FPS, with F/1.4 lens) that were collocated on a base 502 to form the system. In alternative embodiments, a different event camera and/or machine vision camera may be used. Additionally, different resolutions, frame rates, and/or lenses may be used in either of the cameras. In the embodiment shown, the cameras are both wired to receive power from a wall outlet. In an alternative embodiment, one or both cameras can run on one or more batteries that are incorporated into the cameras or otherwise mounted to the base 502. As shown, the base 502 is a rigid surface with a plurality of mounting holes to receive the various components of the imaging system. Alternatively, a different type of base may be used.

Figure 5B:
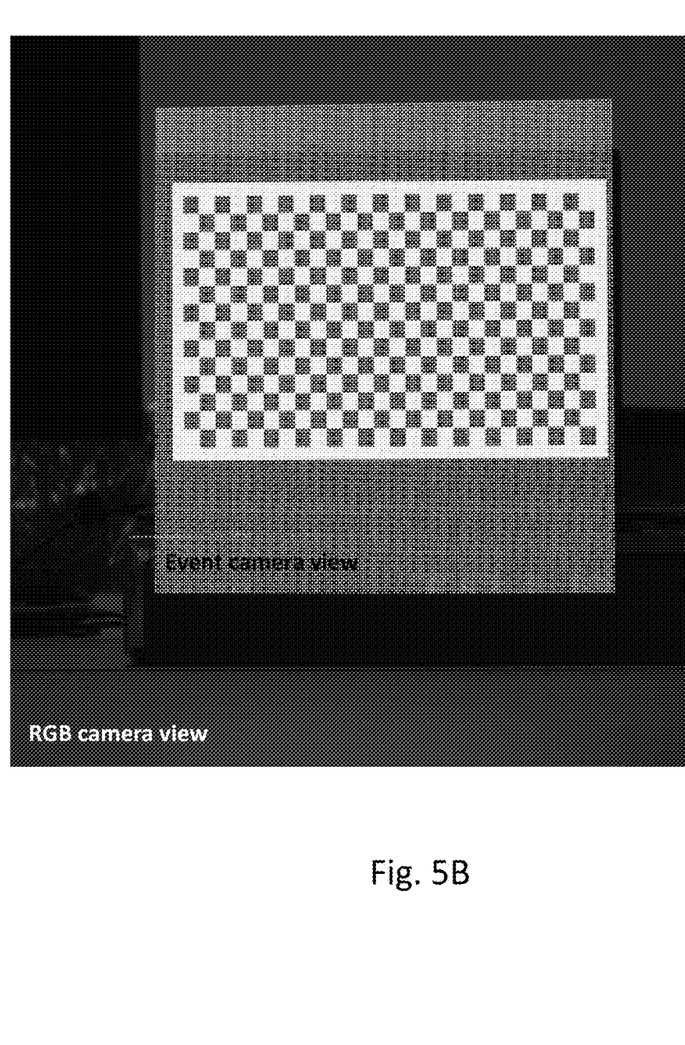
FIG. 5B depicts a checkerboard pattern displayed on a monitor of the imaging system in accordance with an illustrative embodiment.

A beam splitter 510 (e.g., Thorlabs CCM1 BS013) is mounted in front of the two cameras with 50% splitting. The imaging system also incudes a light input 515, and in some embodiments a 13.9" 60 Hertz (Hz) monitor can be used for offline geometric calibration of the signals. Alternatively, a different type of beam splitter and/or monitor may be used. The light input 515 can be an aperture configured to receive ambient light. Alternatively, the system can include a light source such as a light-emitting diode, a laser, etc. For geometric calibration, homographic mapping was mainly considered between two camera views. In order to extract key points from event data, a blinking checkerboard pattern is displayed on the monitor and the captured events are integrated over a time window to form a checkerboard image. FIG. 5B depicts the checkerboard pattern displayed on the monitor of the imaging system in accordance with an illustrative embodiment. For temporal synchronization, a synchronization script was written to trigger the two cameras simultaneously.

Figure 6:
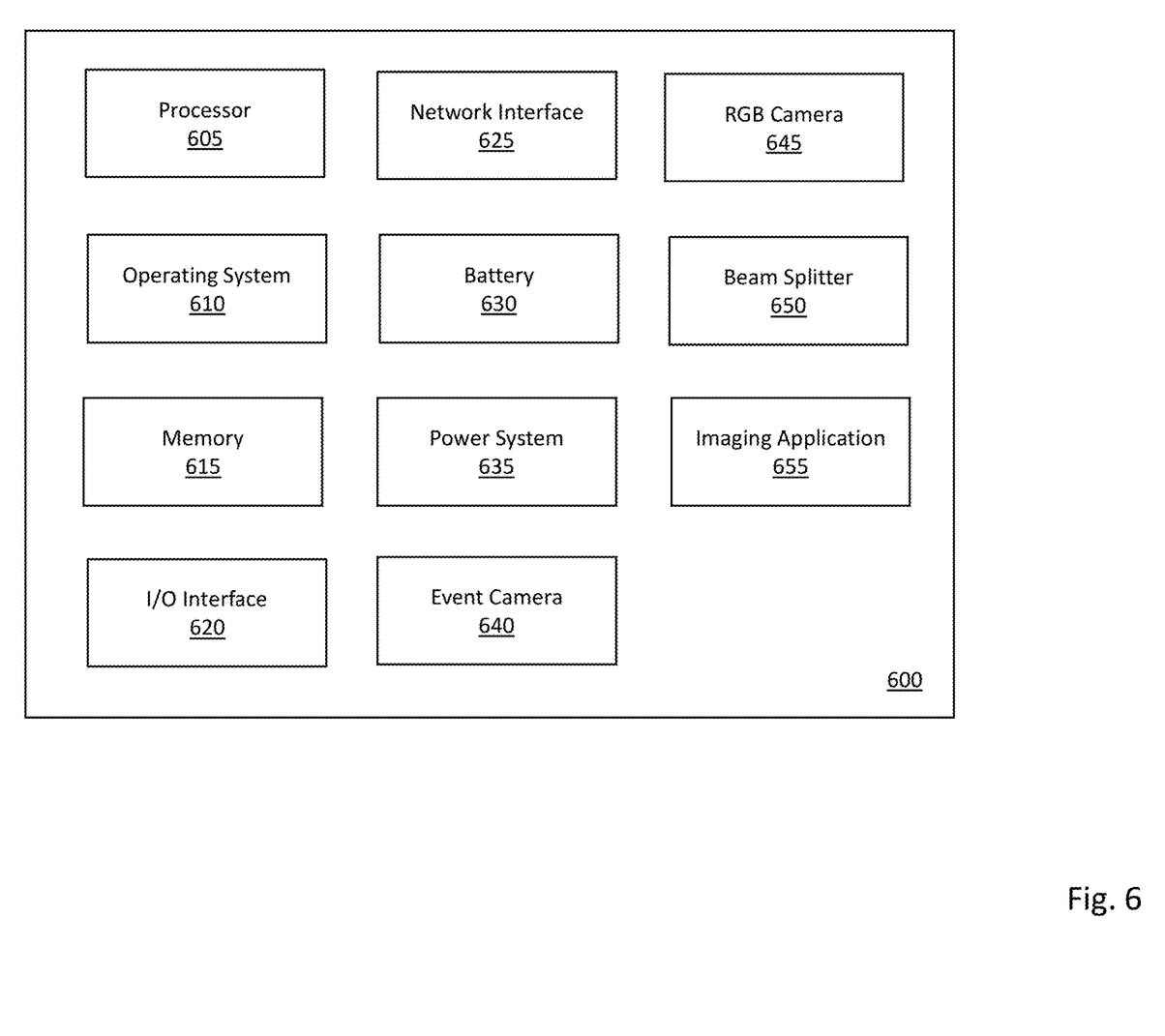
FIG. 6 is a block diagram depicting an imaging system in accordance with an illustrative embodiment.

FIG. 6 is a block diagram depicting an imaging system in accordance with an illustrative embodiment. In alternative embodiments, the imaging system may include fewer, additional, and/or different components. The imaging system includes a base 600 onto which components of the system are mounted. The base 600 can be made of metal, plastic, rubber, or any other suitable material. In one embodiment, the base 600 can include a rigid surface with mounting holes that receive fasteners to mount the various components of the system to the base 600. Alternatively, the base 600 can be a molded component that is configured to receive and house the various system components.

The imaging system also includes a processor 605, an operating system 610, a memory 615, an I/O interface 620, a network interface 625, a battery 630, a power system 635, an event camera 640, a RGB camera 645, a beam splitter 650, and an imaging application 655. In alternative embodiments, the imaging system can include fewer, additional, and/or different components. For example, the imaging system may also include a light source, a display, etc.

In an illustrative embodiment, the various components of the imaging system communicate with one another via one or more buses or any other interconnect system known in the art. The processor 605 can be any type of computer processor known in the art, and can include a plurality of processors and/or a plurality of processing cores. The processor 605 can include a controller, a microcontroller, an audio processor, a hardware accelerator, a digital signal processor, etc. Additionally, the processor 605 may be implemented as a complex instruction set computer processor, a reduced instruction set computer processor, an x86 instruction set computer processor, etc. The processor is used to run the operating system 610, which can be any type of operating system. In one embodiment, the processor 605 can be one or more processors incorporated into the RGB camera 645 and/or the event camera 640. Alternatively, the processor 605 may be separate from the cameras.

The operating system 610 is stored in the memory 615, which is also used to store programs, algorithms, network and communications data, peripheral component data, the imaging application 655, and other operating instructions. The memory 615 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. The memory 615 can also store any images and other data captured by the system.

The I/O interface 620 is the framework which enables users and peripheral devices to interact with the imaging system. The I/O interface 620 can include an on/off switch or other power control, an on/off indicator such as a light, and/or any other components that allow the user to interact with and control the imaging system. The I/O interface 620 also includes circuitry and a bus structure to interface with peripheral computing devices such as power sources, USB devices, remote displays, peripheral component interconnect express (PCIe) devices, serial advanced technology attachment (SATA) devices, high definition multimedia interface (HDMI) devices, proprietary connection devices, etc.

The network interface 625 includes transceiver circuitry that allows the imaging system to transmit and receive data to/from other devices such as remote computing systems, servers, websites, etc. The data can include software updates, operating instructions, parameter settings, etc. The network interface 625 also enables communication through a network, which can be one or more communication networks. The network can include a cable network, a fiber network, a cellular network, a wi-fi network, a landline telephone network, a microwave network, a satellite network, etc. The network interface 625 also includes circuitry to allow device-to-device communication such as Bluetooth® communication. In alternative embodiments, the network interface 625 may not be included in the imaging system.

The battery 630 is used to power the various components of the imaging system, and can be a plurality of batteries in some embodiments. In an illustrative embodiment, the battery 630 is rechargeable can be a lithium-ion battery, a nickel cadmium battery, a nickel-metal hydride battery, etc. In embodiments where the battery 630 is rechargeable, the power system 635 includes a power regulator, a charging port, and a charge control algorithm to control charging of the battery 630 through a power source that connects to the imaging system through the charging port. The power regulator is used to control power to the various components of the system. In some embodiments, the power system 635 can include a dedicated memory to store the charge control algorithm. Alternatively, the charge control algorithm may be stored in the memory 615.

The event camera 640, the RGB camera 645, the beam splitter 650, and the imaging application 655 are used to perform the imaging operations described herein. The imaging application 655 can include software in the form of computer-readable instructions which, upon execution by the processor 605, performs any of the various operations described herein such as receiving data, running algorithms, controlling the event camera 640 and the RGB camera 645, synchronizing the cameras, etc.

Figure 7A:
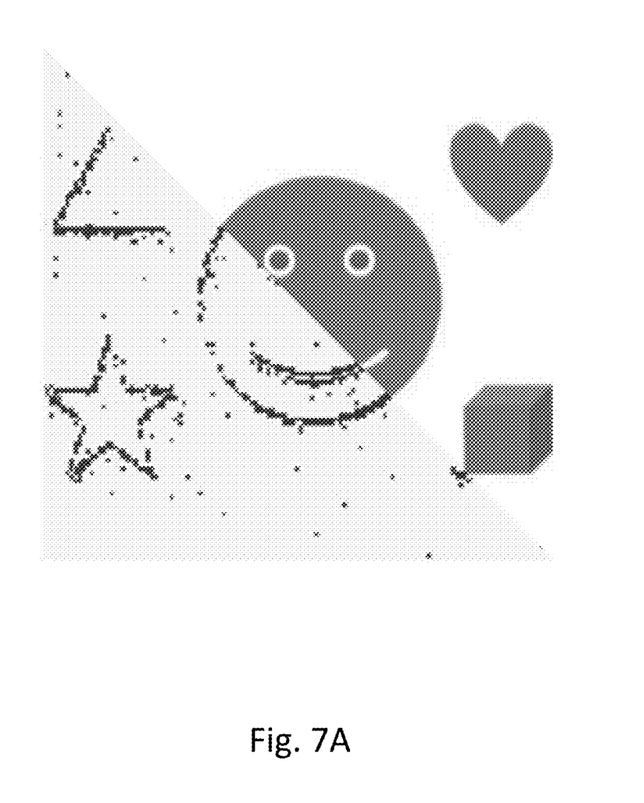
FIG. 7A shows a first event-RGB image captured by the imaging system as part of a video clip in accordance with an illustrative embodiment.
Figure 7B:
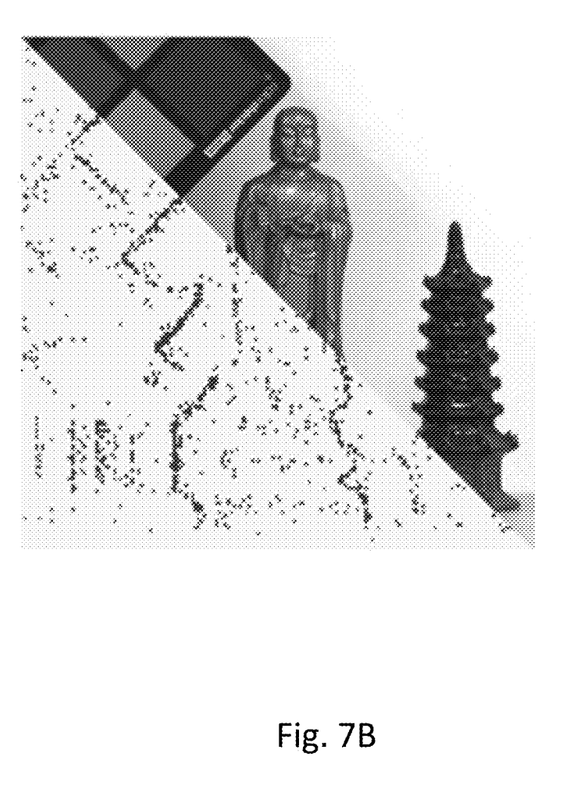
FIG. 7B shows a second event-RGB image captured by the imaging system as part of a video clip in accordance with an illustrative embodiment.

The proposed imaging system was used to collect various sequences of event-RGB video clips. Both indoor and outdoor scenarios were captured, and the scenes ranged widely from simple shapes to complex structures. All the clips involve camera motion and/or scene motion. In total, 20 video clips were used, with an average length of 8s for each clip. Examples are shown in FIG. 7. Specifically, FIG. 7A shows a first event-RGB image captured by the imaging system as part of a video clip in accordance with an illustrative embodiment. FIG. 7B shows a second event-RGB image captured by the imaging system as part of a video clip in accordance with an illustrative embodiment. In each of FIGS. 7A and 7B, the lower-left portion is the converted event frame, and upper-right portion is the RGB image.

Figure 8A:
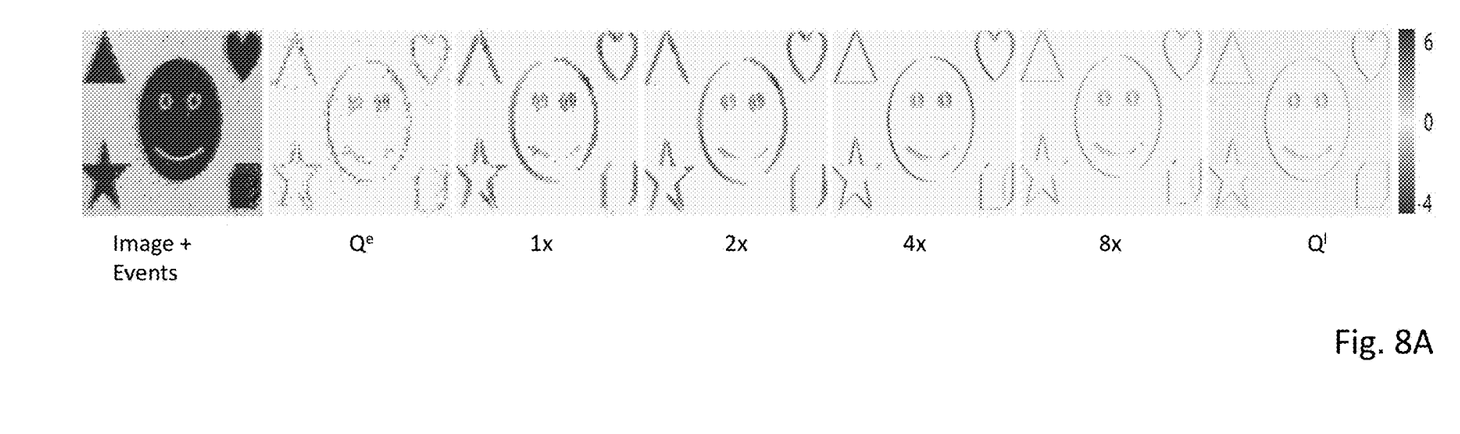
FIG. 8A depicts an up-sampling example corresponding to the image of FIG. 7A in accordance with an illustrative embodiment.
Figure 8B:
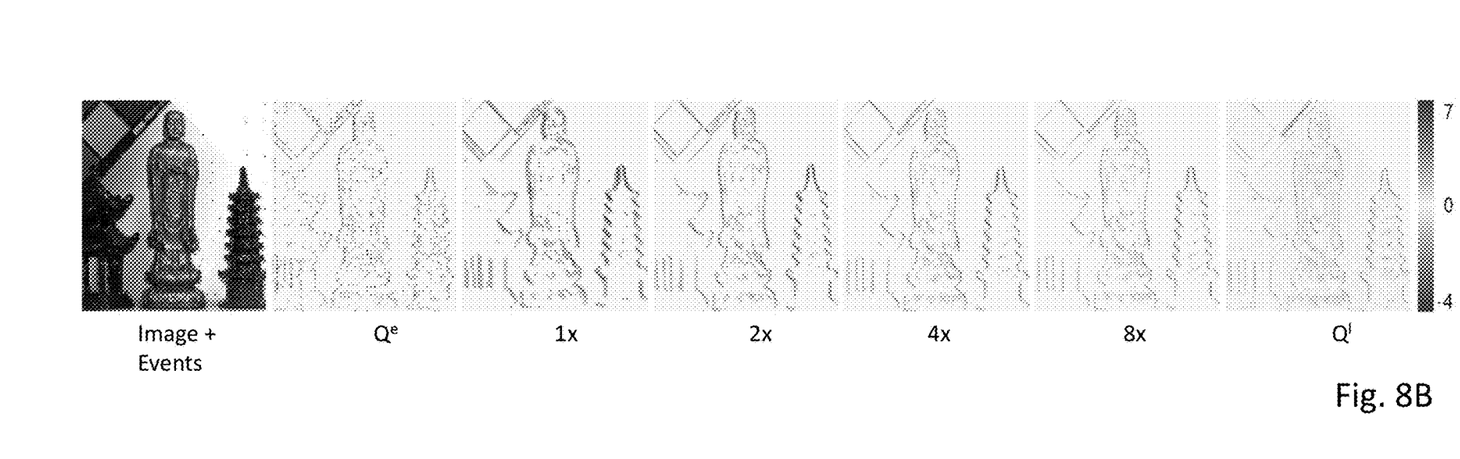
FIG. 8B depicts an up-sampling example corresponding to the image of FIG. 7B in accordance with an illustrative embodiment.

After calibration, guided filtering was performed with three up-sampling scales, i.e., 2×, 4×, 8×. In alternative embodiments, different up-sampling scales may be used such as 16×, 32×, etc. The flow is estimated at 1×. FIG. 8 depicts up-sampling examples corresponding to the scenarios shown in FIGS. 7A and 7B. Specifically, FIG. 8A depicts an up-sampling example corresponding to the image of FIG. 7A in accordance with an illustrative embodiment. FIG. 8B depicts an up-sampling example corresponding to the image of FIG. 7B in accordance with an illustrative embodiment. In FIG. 8, the captured images and calibrated events are shown, along with the filtered output. As can be seen, the events are gradually and effectively up-sampled and denoised.

The proposed GEF has a variety of applications for event-based tasks. Described below are several example applications. One application is high frame-rate video frame synthesis. The task is to reconstruct high frame-rate video frames using a hybrid input of image(s) and events. Future frame prediction can be performed, i.e., given a start intensity frame and the subsequent events to predict the future frame. A differentiable model-based reconstruction (DMR) method was implemented. Without GEF, the reconstruction performance for the case of "slider depth" is 25.10 (PSNR) and 0.8237 (SSIM). With GEF, the reconstruction performance improves to 26.63 (PSNR) and 0.8614 (SSIM).

Motion deblur can also be performed. Specifically, GEF can be applied to improve event based motion deblur. Given a blurry image and the events captured during the exposure time, an event-based double integral (EDI) approach can be used to recover the underlying sharp image(s). In this embodiment, the system used the same formulation, but the GEF was used to first filter the events. It is noted that in this case, the blurry image does not provide useful edge information, and neighbor events are therefore warped to form the guidance images. Even without the guidance of an intensity image, it is shown that GEF can still reduce the event noise using neighbor events. The EDI result was further compared with denoised EDI output using bilateral filtering. Compared to the post-denoising scheme, GEF is more effective in eliminating the event noise.

Figure 9A:
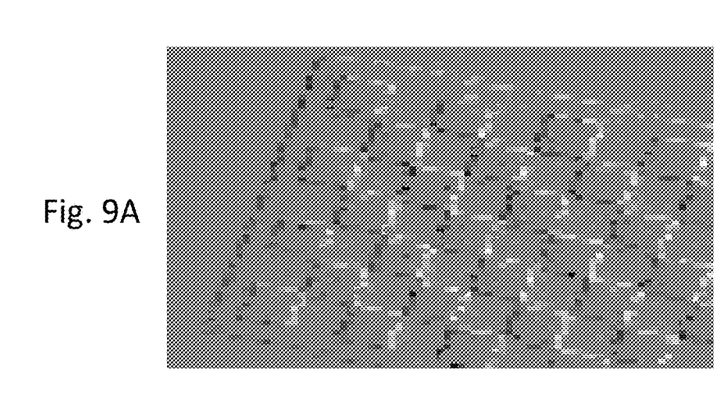
FIG. 9A depicts checkerboard corner detection without GEF in accordance with an illustrative embodiment.
Figure 9B:
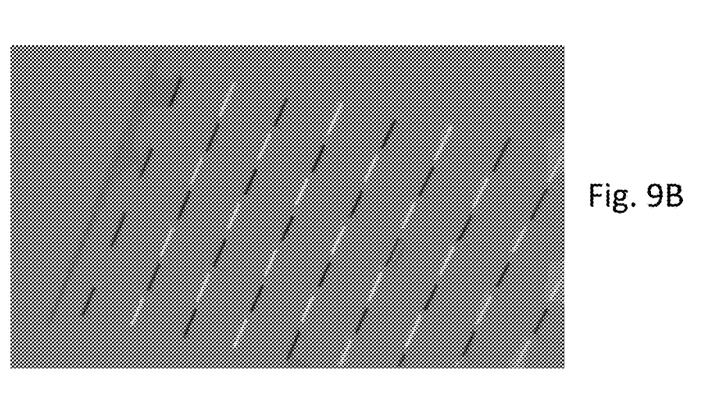
FIG. 9B depicts checkerboard corner detection with GEF and 8× guided up-sampling in accordance with an illustrative embodiment.
Figure 9C:
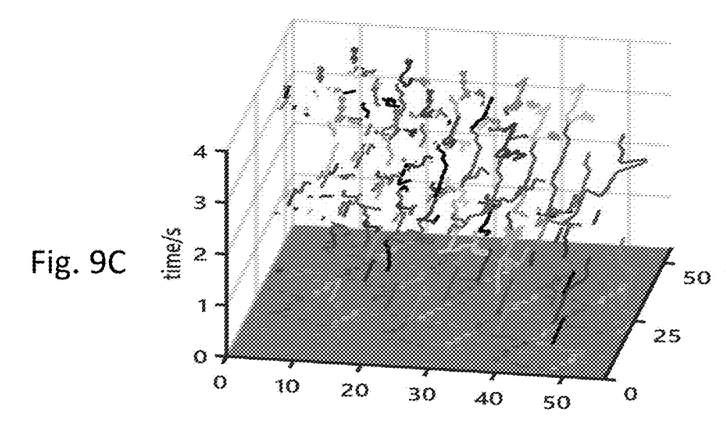
FIG. 9C shows corner tracks computed without the use of GEF in accordance with an illustrative embodiment.
Figure 9D:
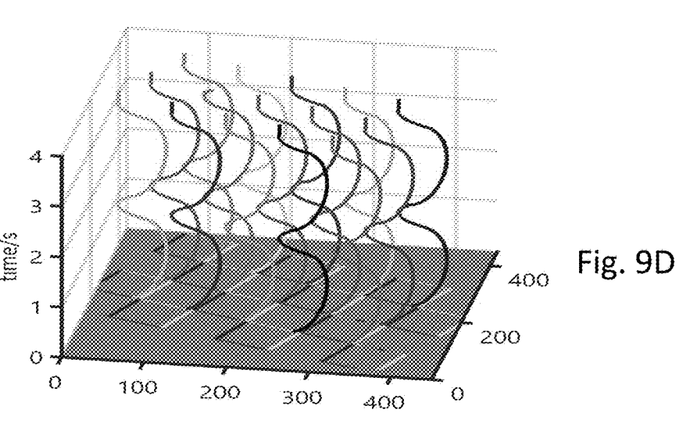
FIG. 9D shows corner tracks computed with the use of up-sampling and GEF in accordance with an illustrative embodiment.

The proposed GEF can also be applied on event-based feature/corner detection and tracking. To demonstrate the benefit of guided up-sampling, the RGB-DAVIS camera was used to capture a periodic circularly moving checkerboard pattern. The event-based Harris corner detector (evHarris) was used as the backbone corner detector. A slight difference between the proposed implementation and the original evHarris is that the proposed system uses the warped event image (motion compensated), instead of directly accumulating events in local windows. FIG. 9A depicts checkerboard corner detection without GEF in accordance with an illustrative embodiment. FIG. 9B depicts checkerboard corner detection with GEF and 8× guided up-sampling in accordance with an illustrative embodiment. As shown, with GEF (8× guided up-sampling), the checkerboard corners are detected more accurately than without the use of GEF. The corner tracks computed both without and with use of the GEF process were also compared. FIG. 9C shows corner tracks computed without the use of GEF in accordance with an illustrative embodiment. FIG. 9D shows corner tracks computed with the use of up-sampling and GEF in accordance with an illustrative embodiment. As can be seen, the corner points that are up-sampled by the GEF can be tracked more accurately than the original frames.

Figure 10A:
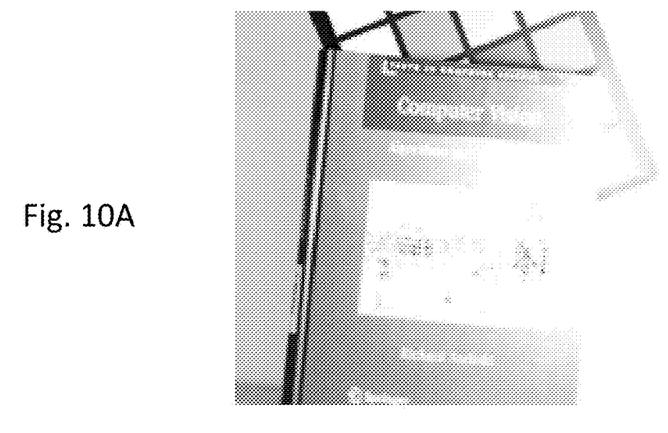
FIG. 10A depicts HDR image reconstruction based on Poisson method with low dynamic range image (overexposed image) in accordance with an illustrative embodiment.
Figure 10B:
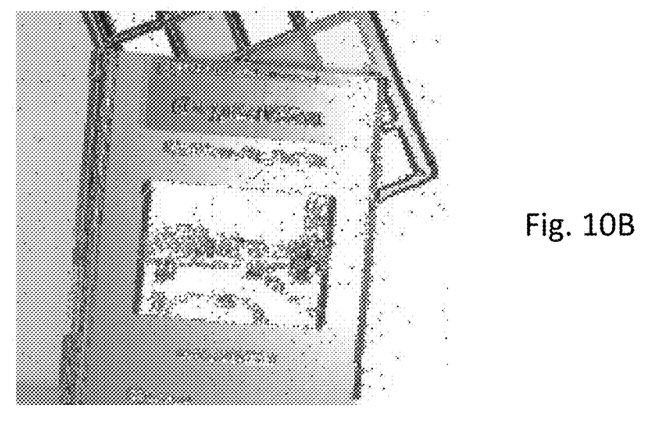
FIG. 10B depicts HDR image reconstruction with images overlaid with events (image+events) in accordance with an illustrative embodiment.
Figure 10C:
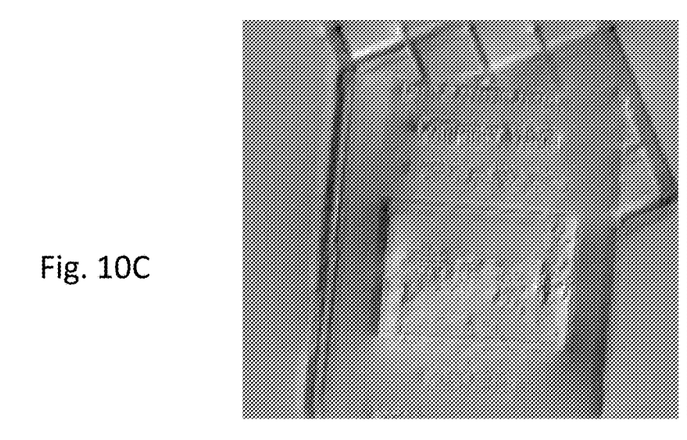
FIG. 10C depicts HDR image reconstruction without the use of GEF in accordance with an illustrative embodiment.
Figure 10D:
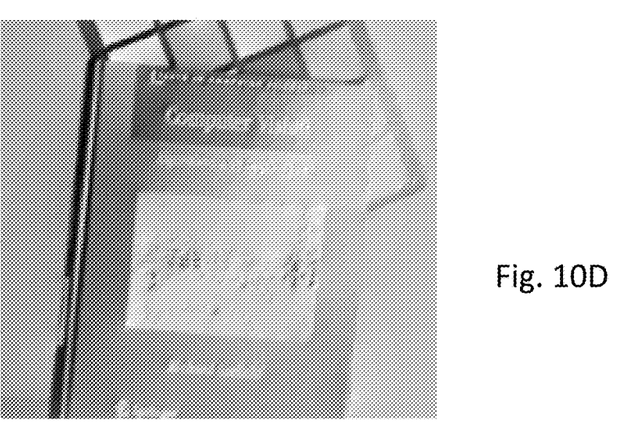
FIG. 10D depicts HDR image reconstruction with the use of GEF in accordance with an illustrative embodiment.

The proposed GEF is able to improve HDR image reconstruction because of its effectiveness for motion compensation and denoising. FIG. 10A depicts HDR image reconstruction based on Poisson method with low dynamic range image (over-exposed image) in accordance with an illustrative embodiment. FIG. 10B depicts HDR image reconstruction with images overlaid with events (image+events) in accordance with an illustrative embodiment. FIG. 10C depicts HDR image reconstruction without the use of GEF in accordance with an illustrative embodiment. FIG. 10D depicts HDR image reconstruction with the use of GEF in accordance with an illustrative embodiment. As shown in FIGS. 10A and 10C, the intensity image contains over-exposed regions while the warped event image preserves structures in those regions. The applied approach employs Poisson reconstruction for HDR reconstruction. Specifically, the intensity image is used for reconstruction. In such case, $\nabla_{xy}I^0$ along with the estimated flow v and the intensity image are then used to reconstruct an HDR image. As can be seen in FIGS. 10C and 10D, the reconstructed HDR image with GEF has higher contrast and less artifacts than without GEF.

Thus, the experimental results showed that with the assistance of intensity images, performance improvement has been achieved for flow estimation, event denoising, and event super resolution (SR). Second, for event SR, the results indicated that directly applying state-of-the-art CNN-based SR algorithms, with or without re-training, performs worse than first applying the same SR algorithms on intensity images and then performing joint filtering. Third, three joint filtering approaches with different properties were evaluated. The results concluded that finding the mutual structure (MS-JF) is better suited than the other two filters considered. Fourth, the system has demonstrated the benefit of event denoising and SR by testing on a variety of downstream tasks.

The systems and methods described herein can be used for a variety of applications, and the system can be expanded to include higher-order motion models, learning based strategies, task-driven filter design, etc. The proposed systems can methods can be used for imaging and sensing, such as high resolution, high speed, and high dynamic range video acquisition. The proposed systems and methods can also be used for computer vision applications such as high (variable) frame-rate video frame synthesis, motion-blurred image deblur, optical flow estimation, feature detection and tracking, depth estimation, etc. The proposed systems and method can further be used for robotics applications such as autonomous driving, visual inertial odometry, simultaneous localization and mapping (SLAM), etc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An imaging system comprising:
    an event camera configured to capture a first image of a scene;
    a shutter camera collocated with the event camera, wherein the shutter camera is configured to capture a second image of the scene; and
    a processor operatively coupled to the event camera and the shutter camera, wherein the processor is configured to:
        perform joint contrast maximization (JCM) to estimate a flow vector based on one or more of the first image and the second image;
        apply guided event filtering (GEF) on the first image and the second image; and
        generate a third image based on filtering of the first image and the second image.

2. The imaging system of claim 1, further comprising a base, wherein the event camera and the shutter camera are mounted to the base.

3. The imaging system of claim 1, further comprising a beam splitter configured to direct a first portion of a received beam to the event camera and a second portion of the received beam to the shutter camera.

4. The imaging system of claim 1, wherein the third image has less noise than the first image and the second image.

5. The imaging system of claim 1, wherein application of GEF results in a joint filtered image that represents a temporal gradient of a captured space-time volume.

6. The imaging system of claim 5, wherein the joint filtered image comprises a motion-compensated event frame.

7. The imaging system of claim 1, wherein the processor is configured to determine a filtered temporal gradient based at least in part on the flow vector.

8. The imaging system of claim 7, wherein the guided event filtering is based at least in part on the filtered temporal gradient.

9. The imaging system of claim 1, wherein the guided event filtering includes up-sampling at least one of the first image and the second image.

10. The imaging system of claim 1, wherein the guided event filtering is part of a motion compensation algorithm.

11. The imaging system of claim 1, further comprising a light source mounted to a base and configured to illuminate the scene.

12. A method of imaging comprising:
    capturing, by an event camera, a first image of a scene;
    capturing, by a shutter camera collocated with the event camera, a second image of the scene;
        performing, by a processor operatively coupled to the event camera and the shutter camera, joint contrast maximization (JCM) to estimate a flow vector based on one or more of the first image and the second image;
        applying, by the processor, guided event filtering (GEF) on the first image and the second image; and
        generating, by the processor, a third image based on filtering of the first image and the second image.

13. The method of claim 12, further comprising splitting, by a beam splitter, a received beam into a first portion that is directed to the event camera and into a second portion that is directed to the shutter camera.

14. The method of claim 12, wherein applying the GEF results in a joint filtered image that represents a temporal gradient of a captured space-time volume.

15. The method of claim 14, wherein the joint filtered image comprises a motion-compensated event frame.

16. The method of claim 12, further comprising determining, by the processor, a filtered temporal gradient based at least in part on the flow vector.

17. The method of claim 12, further comprising up-sampling at least one of the first image and the second image.

18. The method of claim 12, further comprising illuminating the scene by a light source collocated with the event camera and the shutter camera.

* * * * *